(12) United States Patent
Onodera (10) Patent No.: US 7,967,449 B2
(45) Date of Patent: Jun. 28, 2011

(54) ARC TUBE HAVING ELECTRODES INCLUDING COIL WINDING PORTIONS AND PROJECTOR INCLUDING ARC TUBE LIGHT SOURCE

(75) Inventor: Hiroshi Onodera, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 720 days.

(21) Appl. No.: 12/070,533

(22) Filed: Feb. 19, 2008

(65) Prior Publication Data

US 2008/0203918 A1 Aug. 28, 2008

(30) Foreign Application Priority Data

Feb. 28, 2007 (JP) ................................. 2007-048626

(51) Int. Cl.
*G03B 21/20* (2006.01)
(52) U.S. Cl. ............ 353/85; 353/99; 353/122; 313/613; 313/574; 313/628
(58) Field of Classification Search .................. 353/57, 353/99, 122, 85; 313/620–623, 631, 632, 313/628, 343, 344, 574; 445/49–52; 141/71.5, 141/71.6
See application file for complete search history.

(56) References Cited

U.S. PATENT DOCUMENTS

| | | | |
|---|---|---|---|
| 2004/0245930 A1* | 12/2004 | Tukamoto et al. | 313/631 |
| 2006/0055329 A1* | 3/2006 | Yamashita et al. | 313/631 |

FOREIGN PATENT DOCUMENTS

| | | |
|---|---|---|
| JP | 08-273599 | 10/1996 |
| JP | 2005-005183 | 1/2005 |
| JP | 2006-079986 | 3/2006 |

* cited by examiner

*Primary Examiner* — Francis M Legasse, Jr.
(74) *Attorney, Agent, or Firm* — AdvantEdge Law Group, LLC (57) ABSTRACT

An arc tube includes: a tube spherical portion containing a pair of electrodes each of which has a shaft portion and a coil winding portion formed by winding coil around the shaft portion; and a pair of seal portions extending from both sides of the tube spherical portion. The coil winding portion of at least one of the electrodes has a coil portion formed by winding the coil at least once around the shaft portion in the longitudinal direction of the shaft portion, a tip disposed on the tip side of the coil portion, and a base disposed on the base side of the coil portion. The coil of the base positioned on the surface side of the electrode is melt-treated. The coil forming the base is not melted to be combined with the shaft portion.

10 Claims, 4 Drawing Sheets

ARC TUBE HAVING ELECTRODES INCLUDING COIL WINDING PORTIONS AND PROJECTOR INCLUDING ARC TUBE LIGHT SOURCE

BACKGROUND

1. Technical Field

The present invention relates to an arc tube and a projector.

2. Related Art

A related-art arc tube included in a light source of a projector has a tube spherical portion containing a pair of electrodes, and a pair of seal portions extending from both sides of the tube spherical portion (for example, see JP-A-2005-5183). Each electrode provided on this type of arc tube has a shaft portion made of metal having high melting point such as tungsten, and a coil winding portion formed by winding coil such as tungsten around the shaft portion (for example, see JP-A-8-273599).

Recently, there is an increasing demand for an arc tube capable of emitting light having high luminance with the development of a high-luminance projector.

A possible method for increasing luminance of the arc tube in the related art is to raise the temperature of the coolest portion in the discharge space within the tube spherical portion (such as root of the electrode (around a position indicated by A in FIG. 2A which will be described later)). When the temperature of the coolest portion is low, the evaporation capability of metal substance sealed within the tube spherical portion deteriorates. In this case, the lowered efficiency of halogen cycle and blackened tube wall thus caused lowers transmissivity of the arc tube.

For raising the temperature of the coolest portion in the related-art arc tube, it is possible to increase the length of the coil winding portion and wind the coil up to an area close to the root of the electrode. In this case, however, the arc path is guided from the area of the coil winding portion closest to the seal portion toward the tube spherical portion, and the high-temperature arc contacts and collides with the inner wall of the tube spherical portion. As a result, quartz glass ($SiO_2$) as base material of the arc tube evaporates. Then, the evaporated $SiO_2$ is separated into Si and O by discharge plasma, and oxidizes the tungsten constituting the electrode. Thus, the oxide of the tungsten evaporates and easily adheres to the inner surface of the tube spherical portion in the vicinity of the root of the electrode. In this case, the transmissivity of the arc tube easily lowers due to the deposit thus produced. Accordingly, increase in the luminance of the arc tube becomes difficult.

Therefore, in case of the related-art arc tube which increases the length of the coil winding portion and winds the coil up to the vicinity of the root of the electrode, the temperature of the coolest portion in the discharge space within the tube spherical portion can be raised, but the luminance of light from the arc tube cannot be easily increased.

SUMMARY

It is an advantage of some aspects of the invention to provide an arc tube capable of emitting light having high luminance, and a high-luminance projector including this arc tube.

An arc tube according to a first aspect of the invention includes: a tube spherical portion containing a pair of electrodes each of which has a shaft portion and a coil winding portion formed by winding coil around the shaft portion; and a pair of seal portions extending from both sides of the tube spherical portion. The coil winding portion of at least one of the electrodes has a coil portion formed by winding the coil at least once around the shaft portion in the longitudinal direction of the shaft portion, a tip disposed on the tip side of the coil portion, and a base disposed on the base side of the coil portion. The coil of the base positioned on the surface side of the electrode is melt-treated. The coil forming the base is not melted to be combined with the shaft portion.

In this specification, the tip side refers to the arc side of the electrode in the longitudinal direction of the electrode (opposed to the seal portion), and the base side refers to the seal portion side of the electrode in the longitudinal direction of the electrode.

According to the arc tube of this aspect of the invention, the coil winding portion has the tip, the coil portion, and the base. Thus, the temperature of the coolest portion can be raised by positioning the base close to the coolest portion.

Moreover, according to the arc tube of the first aspect of the invention, electrons are not easily released from the surface of the melt-treated base but are easily released from the coil portion. Thus, the discharge starting point at the time of arc discharge is positioned at the coil portion. Since only the base can be disposed close to the coolest portion with the coil portion located away from the coolest portion, the discharge starting position is not shifted to an area around the root of the electrode even when the base is extended to the vicinity of the root of the electrode. Accordingly, contact and collision between the arc and the inner wall of the tube spherical portion, and therefore adhesion of electrode constituting substance to the inner surface of the tube spherical portion can be prevented. As a result, lowering of the transmissivity of the arc tube can be reduced.

Therefore, the arc tube according to the first aspect of the invention can emit light having high luminance.

According to the arc tube of the first aspect of the invention, the coil positioned on the surface side of the base is melt-treated, and has higher heat conductivity than that of the coil not melt-treated. Thus, the temperature of the coolest portion in the discharge space within the tube spherical portion can be raised to a further higher temperature than that of the structure having the coil portion extended to the vicinity of the root of the electrode.

The coil positioned on the surface of the base can be melt-treated by laser beam applied to a part of the coil winding portion, for example. In this case, there is a possibility that the accuracy and strength of the shaft portion are lowered when laser beam is applied to the coil from the base side of the coil winding portion to combine the coil and shaft portion by melting. When the accuracy and strength of the shaft portion lower decrease in the light emission efficiency and shortening of life of the arc tube may occur.

According to the arc tube of the first aspect of the invention, however, the coil forming the base is not melted to be combined with the shaft portion. Thus, the accuracy and strength of the shaft portion do not decrease even when melt-treatment using laser beam or the like is applied to the coil positioned at the base. Accordingly, lowering of the light emission efficiency and shortening of life of the arc tube can be prevented.

It is preferable that the arc tube is a alternating current driving type arc tube, and that each of the coil winding portions of the electrodes has the coil portion, the tip, and the base, the coil forming the base being not melted and combined with the shaft portion according to the arc tube of the first aspect of the invention.

The arc tube according to this aspect of the invention is applicable to an AC driving type arc tube. Thus, the AC driving type arc tube having this structure can emit light having high luminance.

It is preferable that a sub mirror which reflects light emitted from the tube spherical portion toward the tube spherical portion is provided on one of the seal portions, and that the coil winding portion of the electrode on the side opposite to the one seal portion where the sub mirror is provided has the coil portion, the tip, and the base, the coil forming the base being not melted to be combined with the shaft portion according to the arc tube of the first aspect of the invention.

According to this structure, the coil winding portion of the electrode on the other seal portion side (seal portion side where the sub mirror is not provided) has the tip, the coil portion, and the base. Thus, the temperature of the coolest portion on the other seal portion side can be raised by positioning the base close to the coolest portion on the other seal portion side. Moreover, since electrons are not easily released from the surface of the melt-treated base but are easily released from the coil portion, only the base can be disposed close to the coolest portion with the coil portion located away from the coolest portion. In this case, adhesion of the electrode constituting substance to the inner surface of the tube spherical portion can be prevented for the same reason as that discussed above, and therefore lowering of the transmissivity of the arc tube can be reduced.

Furthermore, since the one seal portion side external surface of the tube spherical portion and a part of the one seal portion are covered by the sub mirror, the coolest portion on the one seal portion side can be kept warm. In this case, the coolest portion on the one seal portion side can be raised to some extent. Thus, blacking of the tube wall can be prevented, and the transmissivity of the arc tube can be reduced.

Accordingly, the arc tube having the sub mirror can emit light having high luminance similarly to the above examples.

It is preferable that the coil winding portion has at least two layers of coil wound around the shaft portion in the radial direction of the shaft portion according to the arc tube of the first aspect of the invention.

According to this structure, the size of the coil winding portion is increased to a relatively large size. Thus, the temperature of the coolest portion in the discharge space within the tube spherical portion can be further raised. Since at least two layers of the coil are wound around the shaft portion in the shaft radial direction, the shaft portion and the base are further difficult to be combined by melting when the coil at the base is melt-treated. Thus, lowering of the accuracy and strength of the shaft portion can be further prevented, and therefore decrease in the emission efficiency of the arc tube and shortening of life of the arc tube can be further reduced.

When it is assuming that: a boundary point between a portion of the electrode embedded in the base material of the arc tube and a portion of the electrode exposed to the discharge space within the tube spherical portion is A; a tip position of the electrode is B; the end position of the coil winding portion on the base side is C; the distance between the point A and the point B is $L_{AB}$; and the distance between the point A and the point C is $L_{AC}$, it is preferable that the relation "$L_{AC} \leq 0.3 \times L_{AB}$" is satisfied.

When the relation "$L_{AC} > 0.3 \times L_{AB}$" holds, the base is positioned relatively far from the coolest portion. In this case, raising the temperature of the coolest portion is difficult.

According to the arc tube of the first aspect of the invention, however, the relation "$L_{AC} \leq 0.3 \times L_{AB}$" is satisfied. Thus, the temperature of the coolest portion in the discharge space within the tube spherical portion can be effectively raised.

A projector according to a second aspect of the invention includes: a light source which has the arc tube according to the first aspect of the invention; an electro-optical modulation device which modulates light emitted from the light source according to image information; and a projection system which projects light modulated by the electro-optical modulation device.

The projector according to the second aspect of the invention includes the arc tube of the first aspect of the invention, and thus emits light having high luminance.

BRIEF DESCRIPTION OF THE DRAWINGS

The invention will be described with reference to the accompanying drawings, wherein like reference numbers are given to like elements.

DESCRIPTION OF EXEMPLARY EMBODIMENTS

Examples of an arc tube and a projector according to the invention are hereinafter described with reference to the drawings.

First Embodiment

A structure of an arc tube 1 according to a first embodiment is now described with reference to FIGS. 1A and 1B and FIGS. 2A and 2B.

Figure 1A:
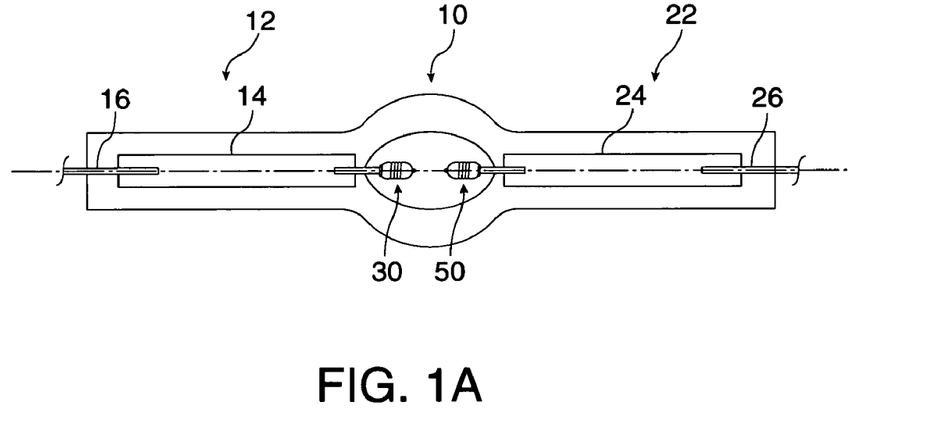
FIGS. 1A and 1B show an arc tube 1 according to the first embodiment.
Figure 1B:
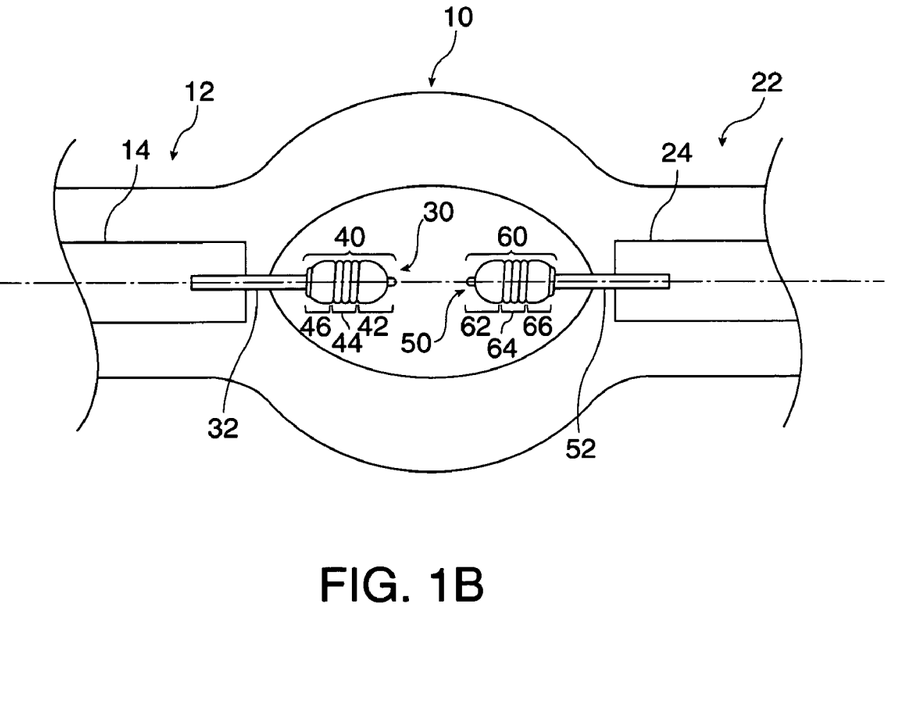
Figure 2A:
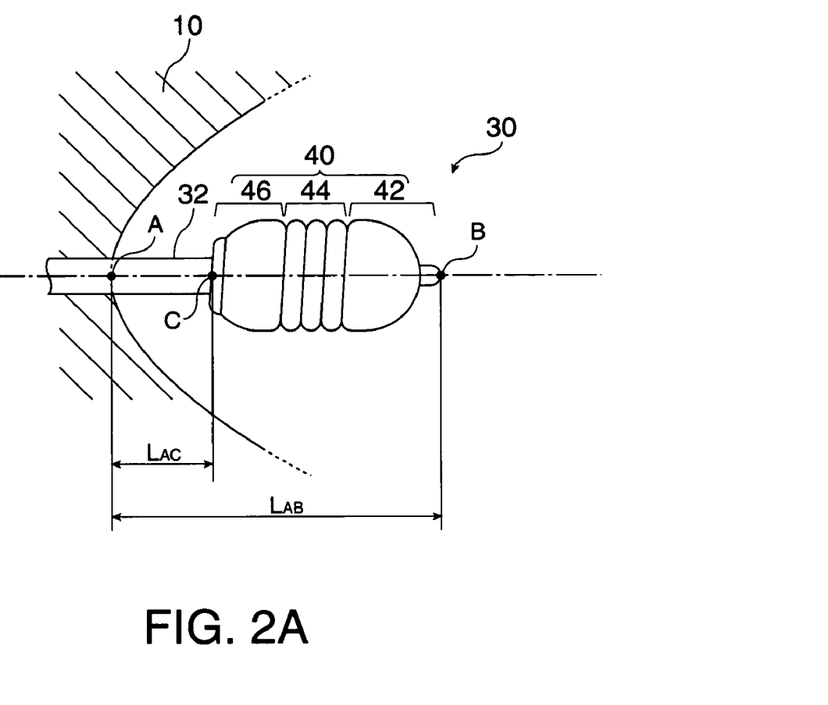
FIGS. 2A and 2B show an electrode 30.
Figure 2B:
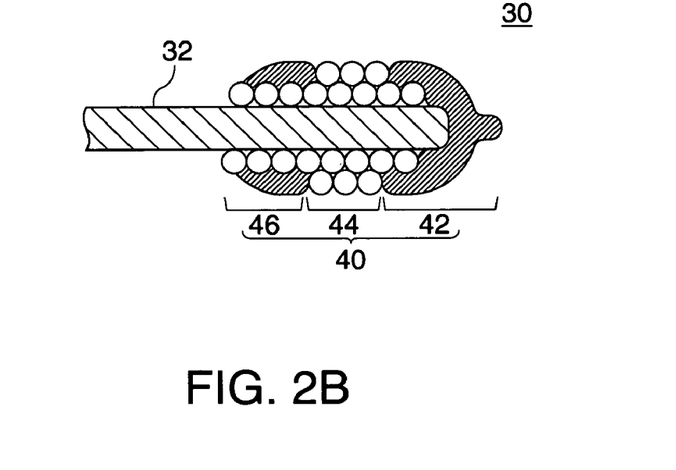

FIGS. 1A and 1B are views for explaining the arc tube 1 according to the first embodiment. FIG. 1A shows the arc tube 1, and FIG. 1B shows an enlarged tube spherical portion 10. FIGS. 2A and 2B are views for explaining an electrode 30. FIG. 2A shows the electrode 30 disposed within the tube spherical portion 10, and FIG. 2B is a cross-sectional view of the electrode 30.

As illustrated in FIGS. 1A and 1B, the arc tube 1 according to the first embodiment is an AC driving type arc tube which includes the tube spherical portion 10 containing a pair of electrodes 30 and 50, a pair of seal portions 12 and 22 extending from both sides of the tube spherical portion 10, a pair of metal foils 14 and 24 sealed within the pair of the seal portions 12 and 22, respectively, a pair of leads 16 and 26 electrically connected with the pair of the metal foils 14 and 24, respectively.

Examples of the conditions for the base material of the arc tube 1 and the like are as follows. The arc tube 10 and the seal portions 12 and 22 are made of quartz glass, for example, and mercury, rare gas, and a small amount of halogen are sealed within the tube spherical portion 10. The electrodes 30 and 50 are tungsten electrodes, for example, and the metal foils 14 and 24 are molybdenum foils, for example. The leads 16 and 26 are made of molybdenum or tungsten, for example.

The arc tube 1 may be any of arc tubes of various types capable of emitting high luminance light, such as high pressure mercury lamp, extra-high pressure mercury lamp, and metal halide lamp.

The electrode 30 on the seal portion 12 side has a shaft portion 32 and a coil winding portion 40. The shaft portion 32 is made of tungsten. The coil winding portion 40 is formed by winding linear tungsten around the shaft portion 32 in a coil shape, for example.

As illustrated in FIGS. 1A and 1B and 2A and 2B, the coil winding portion 40 has a coil portion 44 formed by winding the coil around the shaft portion 32 at least once (three times, for example) in the longitudinal direction of the shaft portion 32, a tip 42 positioned at the tip of the coil portion 44 (arc side in the longitudinal direction of the electrode 30), and a base 46 positioned at the base of the coil portion 44 (seal portion 12 side in the longitudinal direction of the electrode 30). The coil of the base 46 located on the surface side of the electrode 30 is melt-treated. The coil winding portion 40 has two layers of coil wound around the shaft portion 32 in the shaft radial direction (see FIG. 2B). The coil positioned on the surface side of the coil portion 44 is exposed to the discharge space within the tube spherical portion 10.

As illustrated in FIG. 2B, the coil constituting the tip 42 is melted and combined with the shaft portion 32. However, the coil constituting the base 46 is not melted to be combined with the shaft portion 32.

The condition where "the coil is melted and combined with the shaft portion" herein refers to such a condition where the coil and shaft portion are combined with each other by melting the coil. On the other hand, the condition where "the coil is not melted to be combined with the shaft portion" herein refers to such a condition where the coil having the melt-treated portion on the surface side and not melt-treated portion on the shaft portion side is not thus combined with the shaft portion.

The coil can be melt-treated by laser beam applied to the coil, for example. In this case, laser beam such as $CO_2$ laser and YAG laser is applied to the coil successively or by pulse (intermittently) to melt the coil positioned at the tip 42 or the coil positioned on the surface side of the base 46, for example. As a result, the coil positioned on the surface side of the base 46 is melt-treated by the laser beam, but the coil positioned on the inner side of the base 46 is not melt-treated with the shape of the coil maintained. Thus, the coil at the base 46 is not melted to be combined with the shaft portion.

It is preferable that the laser beam is applied in the atmosphere of inert gas such as argon gas so as to prevent oxidation of the electrode.

When it is assumed that: a boundary point between a portion of the electrode 30 embedded in the base material of the arc tube 1 (tube spherical portion 10) and a portion of the electrode 30 exposed to the discharge space within the tube spherical portion 10 is A; a tip position of the electrode 30 is B; the end position of the coil winding portion 40 on the base side is C; the distance between the point A and the point B is $L_{AB}$; and the distance between the point A and the point C is $L_{AC}$; the arc tube 1 according to the first embodiment is so designed as to satisfy the relation "$L_{AC} \leq 0.3 \times L_{AB}$".

The structure of the seal portion 22 side electrode 50 is similar to that of the electrode 30, and the same detailed explanation is not repeated.

According to the arc tube 1 in the first embodiment having this structure, the coil winding portion 40 has the tip 42, the coil portion 44, and the base 46. In this case, the temperature of the coolest portion (the root of the electrode 30 (a portion around the position A shown in FIG. 2A)) can be raised by positioning the base 46 close to the coolest portion.

Moreover, according to the arc tube 1 in the first embodiment, electrons are not easily released from the surface of the melt-treated base 46 but easily released from the coil portion 44. Thus, the discharge starting point at the time of arc discharge is located at the coil portion 44. According to this structure, only the base 46 can be disposed close to the coolest portion with the coil portion 44 positioned away from the coolest portion. Thus, the discharge starting point does not come close to the vicinity of the root of the electrode 30 even when the base 46 is extended toward an area around the root of the electrode 30. In this case, contact and collision between the arc and the inner wall of the tube spherical portion 10 can be prevented, and therefore adhesion of the substance constituting the electrode to the inner surface of the tube spherical portion 10 can be avoided. Accordingly, the transmissivity of the arc tube 1 does not lower.

It is therefore understood that the arc tube 1 according to the first embodiment can emit light having high luminance.

According to the arc tube 1 in the first embodiment, the coil positioned on the surface side of the base 46 is melt-treated and thus has higher heat conductivity than that of the coil not melt-treated. Thus, the temperature of the coolest portion in the discharge space within the tube spherical portion 10 can be raised to a further higher temperature than that in the structure where the coil portion 44 is extended to the vicinity of the root of the electrode 30.

According to the arc tube 1 in the first embodiment, the coil constituting the base 46 is not melt-treated to be combined with the shaft portion 32. Thus, the accuracy and strength of the shaft portion 32 are not decreased even when the coil positioned at the base 46 is melt-treated by laser beam applied thereto or by other method. Accordingly, lowering the light emission efficiency of the arc tube 1 and shortening of life of the arc tube 1 can be prevented.

The arc tube 1 according to the first embodiment is an AC driving type arc tube. The coil winding portions 40 and 60 of the pair of the electrodes 30 and 50 have the coil portions 44 and 64, tips 42 and 62, and the bases 46 and 66, respectively. The coils constituting bases 46 and 66 are not melted to be combined with the shaft portions 32 and 52. Thus, the AC driving type arc tube can emit light having high luminance.

According to the arc tube 1 in the first embodiment, the coil winding portion 40 has at least two layers wound around the shaft portion 32 in the radial direction of the shaft portion 32. In this case, the size of the coil winding portion 40 becomes relatively large, and thus the temperature of the coolest portion in the discharge space within the tube spherical portion 10 can be further raised. In addition, since the coil is wound around the shaft portion 32 to form two or more layers in the radial direction of the shaft portion 32, the shaft portion 32 and the base 46 are more difficult to be combined at the time of the melting process applied to the coil positioned at the base 46. Thus, lowering of the accuracy and strength of the shaft portion 32 can be further reduced. Accordingly, decrease in the light emission efficiency of the arc tube 1 and shortening of life of the arc tube 1 can be further prevented.

According to the first embodiment, the arc tube 1 is so designed as to satisfy the relation "$L_{AC} \leq 0.3 \times L_{AB}$". In this case, the base 46 is positioned relatively close to the coolest portion. Thus, the temperature of the coolest portion in the discharge space within the tube spherical portion 10 can be effectively raised.

Second Embodiment

Figure 3A:
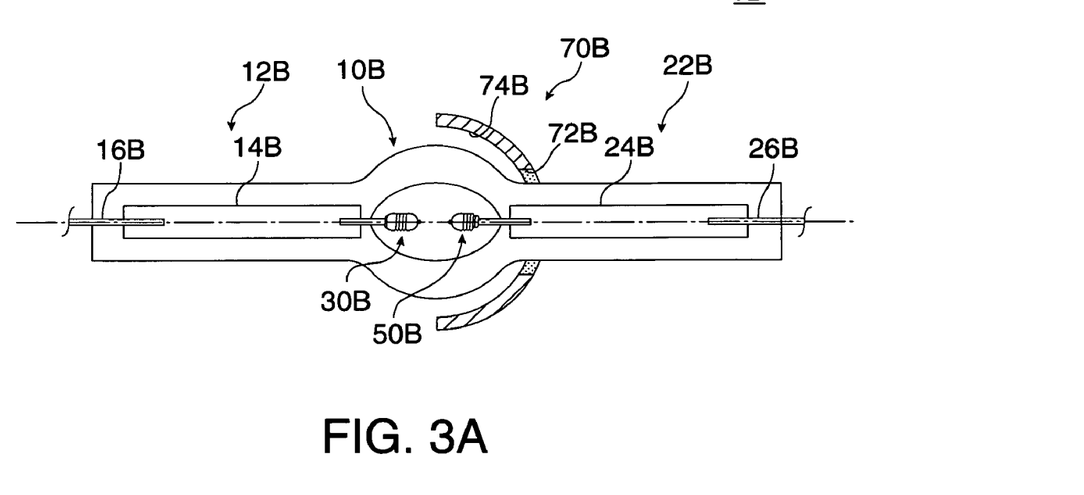
FIGS. 3A and 3B show an arc tube 1B according to a second embodiment.
Figure 3B:
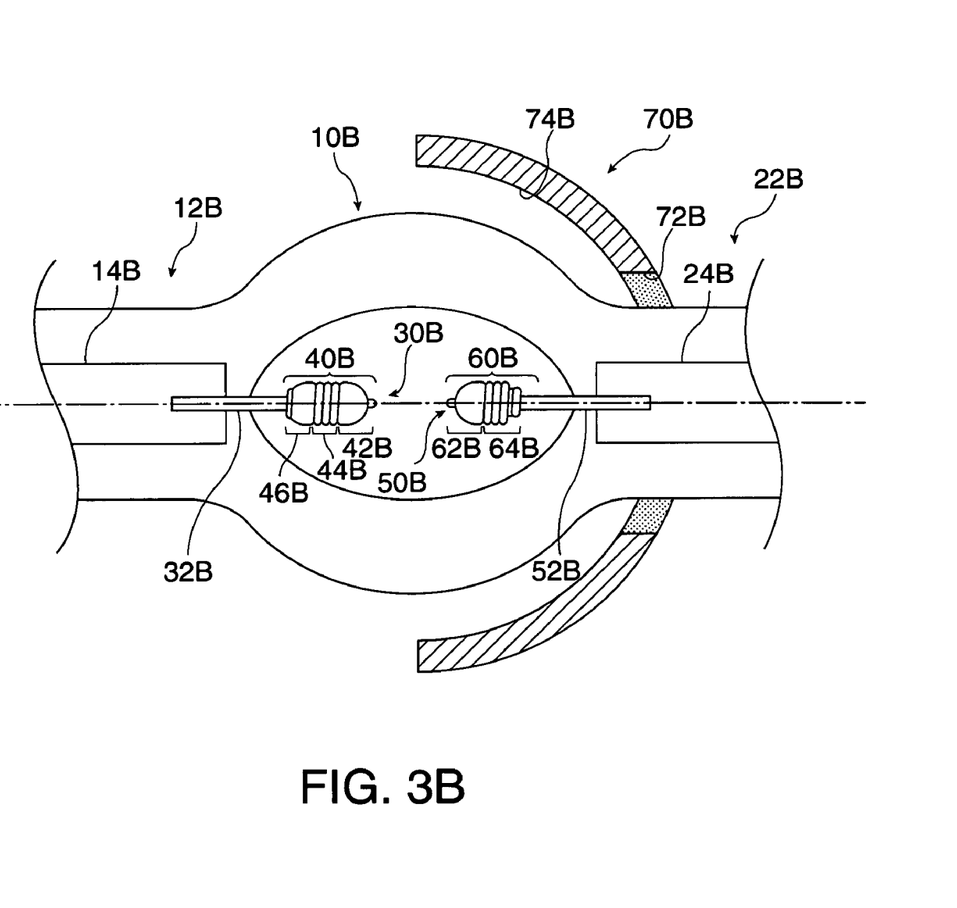

FIGS. 3A and 3B are views for explaining an arc tube 1B according to a second embodiment. FIG. 3A shows the arc tube 1B, and FIG. 3B shows the enlarged arc tube 10B.

The basic structure of the arc tube 1B according to the second embodiment is similar to that of the arc tube 1 according to the first embodiment, but is different in that a sub mirror is provided on one of the seal portions and that the sub mirror side (the seal portion side where the sub mirror is provided) electrode has a different structure.

As illustrated in FIGS. 3A and 3B, the arc tube 1B according to the second embodiment is an AC driving type arc tube which has a tube spherical portion 10B containing a pair of electrodes 30B and 50B, a pair of seal portions 12B and 22B extending from both sides of the tube spherical portion 10B, a pair of metal foils 14B and 24B sealed within the pair of the seal portions 12B and 22B, a pair of leads 16B and 26B electrically connected with the pair of the metal foils 14B and 24B, respectively, and a sub mirror 70B provided on the seal portion 22B to reflect light emitted from the tube spherical portion 10B toward the tube spherical portion 10B.

The seal portion 12B side electrode 30B has a shaft portion 32B and a coil winding portion 40B. The shaft portion 32B is constituted by tungsten. The coil winding portion 40B is formed by winding linear tungsten around the shaft portion 32B in a coil shape, for example.

The coil winding portion 40B has a coil portion 44B where the coil is wound around the shaft portion 32B at least once (three times, for example) in the longitudinal direction of the shaft portion 32B, a tip 42B positioned at the tip of the coil portion 44B (arc side in the longitudinal direction of the electrode 30B), and a base 46B positioned at the base of the coil portion 44B (seal portion 12B side in the longitudinal direction of the electrode 30B). The coil of the base end 46B located on the surface side of the electrode 30B is melt-treated. The coil winding portion 40B has two or more layers of coil wound around the shaft portion 32B in the shaft radial direction of the shaft portion 32B, though not shown in the figure. The coil positioned on the surface side of the coil portion 44B is exposed to the discharge space within the tube spherical portion 10B. The coil constituting the tip 42B is melted and combined with the shaft portion 32B. However, the coil constituting the base 46B is not melted to be combined with the shaft portion 32B.

Similarly to the first embodiment, the coil positioned on the surface side of the base 46B is melt-treated by laser beam applied thereto or by other methods. The conditions or the like required at the time of application of the laser beam are not described herein.

The electrode 50B on the seal portion 22B side (sub mirror 70B side) has a shaft portion 52B and a coil winding portion 60B. The shaft portion 52B is constituted by tungsten. The coil winding portion 60B is formed by winding linear tungsten around the shaft portion 52B in a coil shape, for example.

The coil winding portion 60B has a coil portion 64B where the coil is wound at least once (three times, for example) in the longitudinal direction of the shaft portion 52B, and a tip 62B positioned at the tip of the coil portion 64B (arc side in the longitudinal direction of the electrode 50B). The coil winding portion 60B has two or more layers of coil wound around the shaft portion 52B in the shaft radial direction, though not shown in the figure. The coil positioned on the surface side of the coil portion 64B is exposed to the discharge space within the tube spherical portion 10B. The coil constituting the tip 62B is melted and combined with the shaft portion 52B.

The sub mirror 70B is a reflection unit which covers approximately half of the tube spherical potion 10B and is positioned on the seal portion 22B of the arc tube 1B. The sub mirror 70B has an opening 72B through which the seal portion 22B is inserted to be fixed thereto, and a reflection concave surface 74B which reflects light emitted toward the illumination receiving area from the tube spherical portion 10B to return the light to the tube spherical portion 10B. The sub mirror 70B is fixed to the seal portion 22B by inorganic adhesive such as cement injected into the opening 72B.

As described above, the arc tube 1B according to the second embodiment is different from the arc tube 1 according to the first embodiment in that the sub mirror is provided on one of the seal portions and that the electrode on the sub mirror side (the seal portion side where the sub mirror is provided) has the different structure. However, similarly to the arc tube 1 in the first embodiment, the temperature of the coolest portion (root area of electrode 30B) can be raised by positioning the base 46B close to the coolest portion since the coil winding portion 40B of the seal portion 12B side electrode 30B has the tip end 42B, the coil portion 44B, and the base 46B. Moreover, since only the base 46B can be disposed close to the coolest portion with the coil portion 44B positioned away from the coolest portion, lowering of the transmissivity of the arc tube 1b can be prevented similarly to the arc tube 1 in the first embodiment.

The outside surface of the seal portion 22B side tube spherical portion 10B and a part of the seal portion 22B are covered by the sub mirror 70B. Thus, the seal portion 22B side coolest portion (root area of electrode 50B) is kept warm, and the temperature of the seal portion 22B side coolest portion can be increased to some extent. As a result, blacking of the tube wall can be prevented, and lowering of the transmissivity of the arc tube 1B can be reduced.

Accordingly, the arc tube 1B according to the second embodiment can emit light having high luminance similarly to the arc tube 1 according to the first embodiment.

The arc tube 1B according to the second embodiment has a structure similar to that of the arc tube 1 according to the first embodiment except for the provision of the sub mirror positioned on one of the seal portions and for the different structure of the sub mirror side (the seal portion side where the sub mirror is provided) electrode. Thus, the arc tube 1B offers advantages in connection with the second embodiment contained in the advantages provided by the arc tube 1 in the first embodiment.

Third Embodiment

Figure 4:
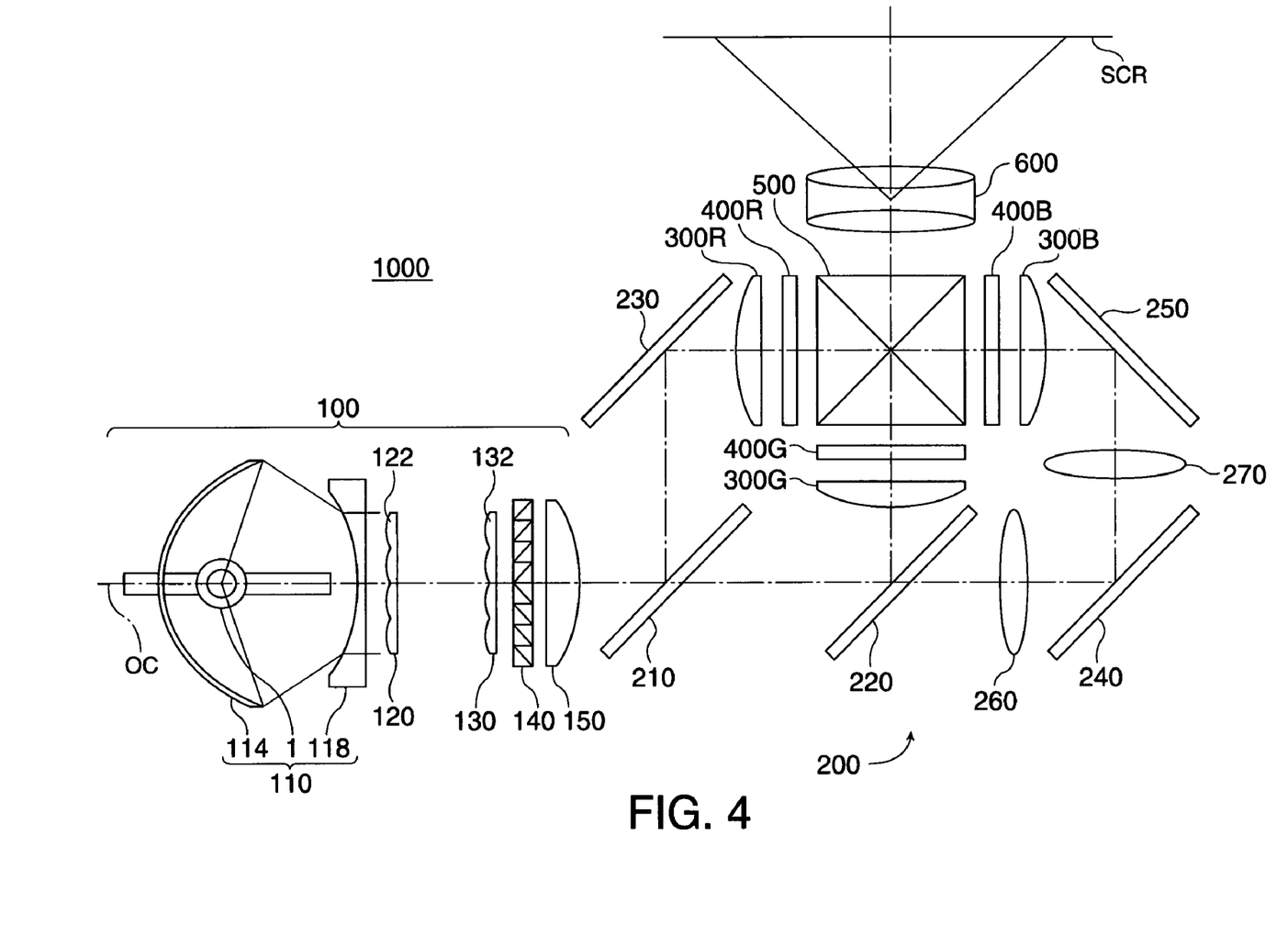
FIG. 4 illustrates optical systems of a projector 1000 according to a third embodiment.

FIG. 4 illustrates optical systems of a projector 1000 according to a third embodiment.

As illustrated in FIG. 4, the projector 1000 according to the third embodiment includes a lighting device 100, a color separation and light guide system 200 which separates illumination light emitted from the lighting device 100 into three color lights of red light, green light and blue light and guides the separated three color lights to the illumination receiving area, three liquid crystal devices 400R, 400G and 400B as electro-optical modulation devices which modulate each of the three color lights separated by the color separation and light guide system 200 according to image information, a cross dichroic prism 500 which combines the color lights modulated by the three liquid crystal devices 400R, 400G and 400B, and a projection system 600 which projects the light combined by the cross dichroic prism 500 onto a projection surface such as a screen SCR.

The lighting device 100 has a light source 110 for emitting illumination light toward the illumination receiving area, a first lens array 120 having a plurality of first small lenses 122 which divide the illumination light emitted from the lighting device 110 into a plurality of partial lights, a second lens array 130 having a plurality of second small lenses 132 corresponding to the plural first small lenses 122 of the first lens array 120, a polarization conversion element 140 which converts the respective partial lights received from the second lens array 130 into linear polarized lights of substantially one type and releases the converted lights, and a superimposing lens 150 which superimposes the respective partial lights released from the polarization conversion element 140 on the illumination receiving area.

The lighting device 110 has an ellipsoidal surface reflector 114, the arc tube 1 having its emission center located around a first focus of the ellipsoidal surface reflector 114, and a concave lens 118 which converts the converged light received from the ellipsoidal surface reflector 114 into substantially collimated light. The light source 110 emits light having its center axis corresponding to an illumination optical axis OC.

The arc tube 1 is constituted by the arc tube 1 described in the first embodiment, and the same detailed explanation is not repeated.

The ellipsoidal surface reflector 114 has a neck-shaped cylindrical portion through which one of the seal portions of the arc tube 1 is inserted and fixed thereto, and a reflection concave surface which reflects light emitted from the arc tube 1 toward a second focus.

The concave lens 118 is disposed at a position shifted toward the illumination receiving area from the position of the ellipsoidal surface reflector 114. The concave lens 118 receives light from the ellipsoidal surface reflector 114 and releases the light toward the first lens array 120.

The first lens array 120 has a function of a light division optical element which divides light received from the concave lens 118 into a plurality of partial lights, and has the plural first small lenses 122 disposed in matrix having plural lines and rows on a plane perpendicular to the illumination optical axis OC. Though not shown in the figure, each external shape of the first small lenses 122 is similar to each external shape of the image forming areas of the liquid crystal devices 400R, 400G and 400B.

The second lens array 130 has a function of forming images of the respective first small lenses 122 at positions around the image forming areas of the liquid crystal devices 400R, 400G and 400B in cooperation with the superimposing lens 150. The second lens array 130 has a structure substantially similar to that of the first lens array 120, and has the plural second small lenses 132 disposed in matrix having plural lines and rows on a plane perpendicular to the illumination optical axis OC.

The polarization conversion element 140 converts the respective partial lights divided by the first lens array 120 into linear polarized lights of substantially one type having the same polarization direction, and releases the converted lights.

The polarization conversion element 140 has a polarization division layer which transmits light having one of the polarization components (P polarization component, for example) in the illumination light emitted from the light source 110 and reflects light having the other polarization component (S polarization component, for example) such that the reflected light travels in the direction perpendicular to the illumination optical axis OC. The polarization conversion element 140 further has a reflection layer which reflects the light having the other polarization component and reflected by the polarization division layer such that the reflected light travels in the direction parallel with the illumination optical axis OC, and a retardation film which converts the light having the one polarization component and having passed through the polarization division layer into light having the other polarization component.

The superposing lens 150 is an optical element which converges the plural partial lights having passed through the first lens array 120, the second lens array 130, and the polarization conversion element 140 and superimposes the lights at a position around the image forming areas of the liquid crystal devices 400R, 400G and 400B. The superimposing lens 150 is disposed in such a position that the optical axis of the superimposing lens 150 substantially coincides with the illumination optical axis OC of the lighting device 100. The superimposing lens 150 may be a composite lens formed by combining a plurality of lenses.

The color division and light guide system 200 has dichroic mirrors 210 and 220, reflection mirrors 230, 240 and 250, an entrance side lens 260, and a relay lens 270. The color division and light guide system 200 has a function of dividing illumination light emitted from the superimposing lens 150 into three color lights of red light, green light and blue light, and guiding the separated color lights toward the three liquid crystal devices 400R, 400G and 400B as illumination targets.

The liquid crystal devices 400R, 400G and 400B modulate illumination light according to image information as illumination targets of the lighting device 100.

Each of the liquid crystal devices 400R, 400G and 400B is formed by sealing liquid crystals as electro-optical substances between a pair of transparent glass substrates, and modulates the polarization direction of one type of linear polarized light released from an entrance side polarization plate which will be described later according to given image information by using polysilicon TFTs as switching elements, for example.

Converging lenses 300R, 300G and 300B are provided before the liquid crystal devices 400R, 400G and 400B on the respective optical paths.

Though not shown in the figure, the entrance side polarization plate is interposed between each pair of the converging lenses 300R, 300G and 300B and the liquid crystal devices 400R, 400G and 400B, and an exit side polarization plate is interposed between the cross dichroic prism 500 and each of the liquid crystal devices 400R, 400G and 400B. The entering color lights are modulated by the entrance side polarization plates, the liquid crystal devices 400R, 400G and 400B, and the exit side polarization plates.

The cross dichroic prism 500 is an optical element which combines the respective color lights released from the exit side polarization plates into an optical image to form a color image. The cross dichroic prism 500 has a substantially square shape in the plan view formed by affixing four rectangular prisms. Dielectric multilayer layers are provided on the boundary surfaces of a substantially X shape formed by affixing the rectangular prisms. The dielectric multilayer layer disposed on one of the boundary surfaces of the substantially X shape reflects red light, and the dielectric multilayer layer disposed on the other boundary surface reflects blue light. Red light and blue light are bended by these dielectric multilayer layers such that these lights can travel in the same direction as that of green light, allowing the three color lights to be combined.

A color image released from the cross dichroic prism 500 is enlarged and projected by the projection system 600 such that a large screen image can be formed on the screen SCR.

The projector 1000 having this structure according to the third embodiment is a high-luminance projector since the projector 1000 includes the arc tube 1 according to the first embodiment.

The invention is not limited to the arc tube and projector described in the respective embodiments, and it is therefore intended that various modifications and changes may be made without departing from the scope and spirit of the invention. For example, the following modifications may be made.

(1) While the number of windings of the coil portion (the number of windings in the longitudinal direction of the shaft portion) is three in the arc tubes 1 and 1B according to the first and second embodiments, this number is not limited to three. The number of windings of the coil portion may be one or any larger number.

(2) While the number of winding layers of the coil winding portion (the number of winding layers in the radial direction of the shaft portion) is two in the arc tubes 1 and 1B according to the first and second embodiments, the number of winding layers is not limited two. The number of winding layers may be three or larger.

(3) While the coil is melt-treated by laser beam applied thereto as an example of the invention, the coil may be melt-treated by electron beam, for example.

(4) While the arc tubes 1 and 1B according to the first and second embodiments have been applied to an AC driving type arc tube, they may be applied to a DC driving type arc tube. In this case, such a structure may be employed where each coil winding portion of both the electrodes (anode and cathode) has the tip, the coil portion, and the base, the coil of which base is not melted to be combined with the shaft portion. Alternatively, only the coil winding portion of one of the electrodes (such as anode) may have the above structure.

(5) The structure according to the first embodiment has been applied to both the electrodes 30 and 50 in the arc tube 1. However, when only the temperature of the coolest portion on one of the seal portion sides is desired to be raised according to the use environment of the arc tube, the structure of the first embodiment may be applied to only the electrode on the corresponding seal portion side. When only the temperature of the other seal portion side coolest portion is desired to be raised, the structure of the first embodiment may be applied only to the other seal portion side electrode.

(6) The structure according to the second embodiment has been applied to only the seal portion 12B side electrode 30B of the pair of the electrodes 30B and 50B in the arc tube 1B. It is possible, however, to apply the structure of the second embodiment to both the electrodes 30B and 50B. In this case, the ranges of the coil portions and the bases may be controlled such that the temperatures of the coolest portions at the roots of both the electrodes 30B and 50B can be appropriate temperatures.

(7) While the sub mirror 70B has been used as the reflection unit in the arc tube 1B according to the second embodiment, a reflection layer may be employed as the reflection unit.

(8) While the AC driving type arc tube 1 described in the first embodiment has been used as an arc tube in the projector 1000 in the third embodiment, the arc tube 1B having the sub mirror according to the second embodiment may be employed.

(9) While the light source having the ellipsoidal surface reflector has been used as the light source in the projector 1000 in the third embodiment, a light source having a parabolic surface reflector can be appropriately used. In this case, the concave lens can be eliminated.

(10) While the lens integration system has been used as a light equalization system in the projector 1000 in the third embodiment, a rod integration system having a rod member can be appropriately used.

(11) While the projector 1000 according to the third embodiment is a transmission type projector, the structure of the third embodiment is applicable to a reflection type projector. The "transmission type" herein refers to a type in which an electro-optical modulation device as a light modulation unit transmits light in such a case as a transmission type liquid crystal device, and the "reflection type" refers to a type in which an electro-optical modulation device as a light modulation unit reflects light in such a case as a reflection type liquid crystal device. When the structure according to the third embodiment is applied to the reflection type projector, advantages similar to those of the transmission type projector can be offered.

(12) While the projector 1000 according to the third embodiment has the three liquid crystal devices 400R, 400G and 400B, the structure of the third embodiment is applicable to a projector having one, two, four or more liquid crystal devices.

(13) According to the projector 1000 in the third embodiment, the liquid crystal devices have been used as electro-optical modulation devices. However, it is generally possible to use any type of electro-optical devices as long as they can modulate entering light according to image information, and micro-mirror-type light modulation devices may be employed, for example. The micro-mirror-type light modulation devices used in this case may be DMDs (digital micro-mirror device, trademark of TI Inc.), for example.

(14) The structures according to the embodiments are applicable to both a front-projection-type projector which projects a projection image from the viewing side and a rear-projection-type projector which projects a projection image from the side opposite to the viewing side.

The entire disclosure of Japanese Patent Application No. 2007-048626, filed Jan. 28, 2007 is expressly incorporated by reference herein.

What is claimed is:

1. An arc tube, comprising:
a tube spherical portion containing a pair of electrodes each of which has a shaft portion and a coil winding portion formed by winding coil around the shaft portion; and
a pair of seal portions extending from both sides of the tube spherical portion,
wherein
the coil winding portion of at least one of the electrodes has a coil portion formed by winding the coil at least once around the shaft portion in the longitudinal direction of the shaft portion, a tip disposed on a tip side of the coil portion, and a base disposed on a base side of the coil portion, the base positioned on the surface side of the base side of the coil portion being melt-treated, and
the coil forming the base side of the coil portion is not melted to be combined with the shaft portion.

2. The arc tube according to claim 1, wherein:
the arc tube is an alternating current driving type arc tube; and
each of the coil winding portions of the electrodes has the coil portion, the tip, and the base, the coil forming the base side of the coil portion being not melted and combined with the shaft portion.

3. The arc tube according to claim 1, wherein:
a sub mirror which reflects light emitted from the tube spherical portion toward the tube spherical portion is provided on one of the seal portions;
the coil winding portion of the electrode on the side opposite to the one seal portion where the sub mirror is provided has the coil portion, the tip, and the base, the coil forming the base side of the coil portion being not melted to be combined with the shaft portion.

4. The arc tube according to claim 1, wherein the coil winding portion has at least two layers of coil wound around the shaft portion in the radial direction of the shaft portion.

5. The arc tube according to claim 1, wherein when it is assumed that: a boundary point between a portion of the electrode embedded in the base material of the arc tube and a portion of the electrode exposed to the discharge space within the tube spherical portion is A; a tip position of the electrode is B; the end position of the coil winding portion on the base side is C; the distance between the point A and the point B is $L_{AB}$; and the distance between the point A and the point C is $L_{AC}$, the relation "$L_{AC} < 0.3 \times L_{AB}$" is satisfied.

6. A projector, comprising:
   a light source which has the arc tube according to claim 1;
   an electro-optical modulation device which modulates light emitted from the light source according to image information; and
   a projection system which projects light modulated by the electro-optical modulation device.

7. The projector according to claim 6, wherein:
   the arc tube is an alternating current driving type arc tube; and
   each of the coil winding portions of the electrodes has the coil portion, the tip, and the base, the coil forming the base side of the coil portion being not melted and combined with the shaft portion.

8. The projector according to claim 6, wherein:
   a sub mirror which reflects light emitted from the tube spherical portion toward the tube spherical portion is provided on one of the seal portions;
   the coil winding portion of the electrode on the side opposite to the one seal portion where the sub mirror is provided has the coil portion, the tip, and the base, the coil forming the base side of the coil portion being not melted to be combined with the shaft portion.

9. The projector according to claim 6, wherein the coil winding portion has at least two layers of coil wound around the shaft portion in the radial direction of the shaft portion.

10. The projector according to claim 6, wherein when it is assumed that: a boundary point between a portion of the electrode embedded in the base material of the arc tube and a portion of the electrode exposed to the discharge space within the tube spherical portion is A; a tip position of the electrode is B; the end position of the coil winding portion on the base side is C; the distance between the point A and the point B is $L_{AB}$; and the distance between the point A and the point C is $L_{AC}$, the relation "$L_{AC} \leqq 0.3 \times L_{AB}$" is satisfied.

* * * * *